US006401442B1

(12) United States Patent
Root et al.

(10) Patent No.: US 6,401,442 B1
(45) Date of Patent: Jun. 11, 2002

(54) DUBBING ASSEMBLY IN FLY HOOK PRODUCTION

(76) Inventors: Bradford Stanley Root, 422 Laurler Drive, Kamloops, British Columbia (CA), V1S 1C4; Leonard Raymond Root, 1362 Cornwall St., Kamloops, British Columbia (CA), V2B 2T4

( * ) Notice: Subject to any disclaimer, the term of this patent is extended or adjusted under 35 U.S.C. 154(b) by 0 days.

(21) Appl. No.: 09/326,760

(22) Filed: Jun. 4, 1999

Related U.S. Application Data

(60) Provisional application No. 60/087,969, filed on Jun. 4, 1998.

(51) Int. Cl.[7] ................................................. D01H 3/42
(52) U.S. Cl. ..................... 57/27; 57/3; 57/10; 57/11; 57/22; 57/24; 57/28; 57/203
(58) Field of Search ...................... 43/25, 42.25, 42.53; 57/3, 10, 11, 22, 24, 27, 28, 203

(56) References Cited

U.S. PATENT DOCUMENTS

| | | | |
|---|---|---|---|
| 3,821,862 A | 7/1974 | Teeny | 43/42.25 |
| 4,023,301 A | 5/1977 | Warner | 43/42.25 |
| 4,169,562 A | 10/1979 | Renzetti | 242/7.01 |
| 4,292,797 A | * 10/1981 | Auger | 57/24 |
| 4,442,981 A | 4/1984 | Cope | 242/7.19 |
| 4,562,870 A | 1/1986 | Calvin | 140/149 |
| 4,656,769 A | 4/1987 | Walker | 43/1 |
| 5,119,583 A | 6/1992 | Mason | 43/42.53 |
| 5,169,079 A | 12/1992 | Renzetti | 242/7.19 |
| 5,716,020 A | * 2/1998 | Shults | 242/443 |

FOREIGN PATENT DOCUMENTS

CA  2140452  2/1994  .......... A91K/85/08

OTHER PUBLICATIONS

Ted Leeson and Jim Schollmeyer The Fly Tier's Benchside Reference to Techniques and Dressing Styles ©1998 pp. 124–142.

* cited by examiner

*Primary Examiner*—John J. Calvert
*Assistant Examiner*—Shaun R Hurley
(74) *Attorney, Agent, or Firm*—Chernoff, Vilhauer, McClung & Stenzel, LLP

(57) ABSTRACT

A machine for dubbing assembly in fly hook production includes a base having a vertical dowel mounted to one end of the base, and a housing mounted to the other end. A work platform is pivotally mounted to one side of the base so that the platform may be elevated or lowered. A drive motor is mounted within the housing. The motor drives a drive shaft. The drive shaft terminates in a hook or eye. A second eye is mounted to the vertical dowel. The second eye projects toward, in opposed facing relation with, the drive shaft. The second eye supports a tensioning spring which has a barrel swivel attached to its opposite end. One or more filaments may be attached to a ring on the barrel swivel so as to extend across the work platform and be secured to the hook or eye on the drive shaft. Dubbing material is applied to a single filament or sandwiched between double strand filaments. Double strand filaments are twisted into a helix to flare the dubbing material.

24 Claims, 9 Drawing Sheets

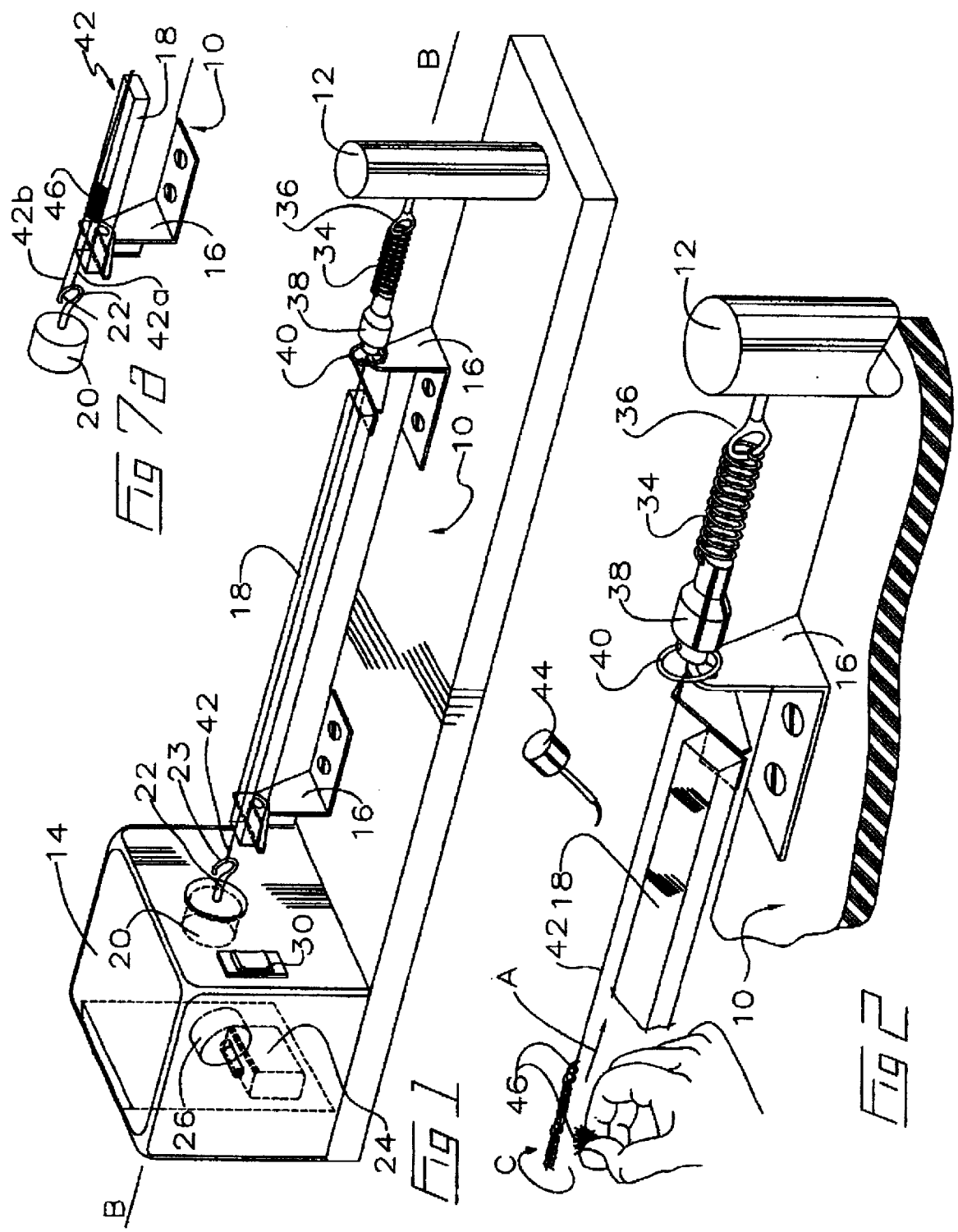

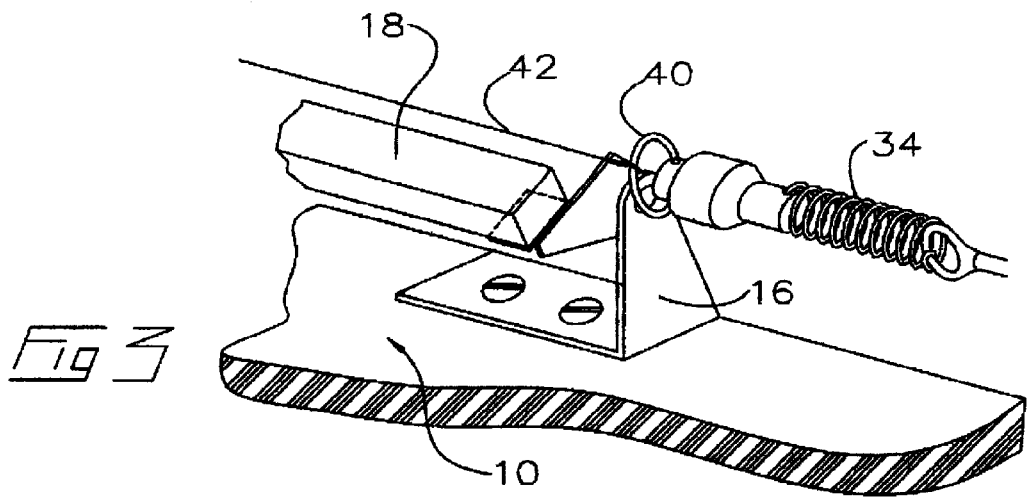
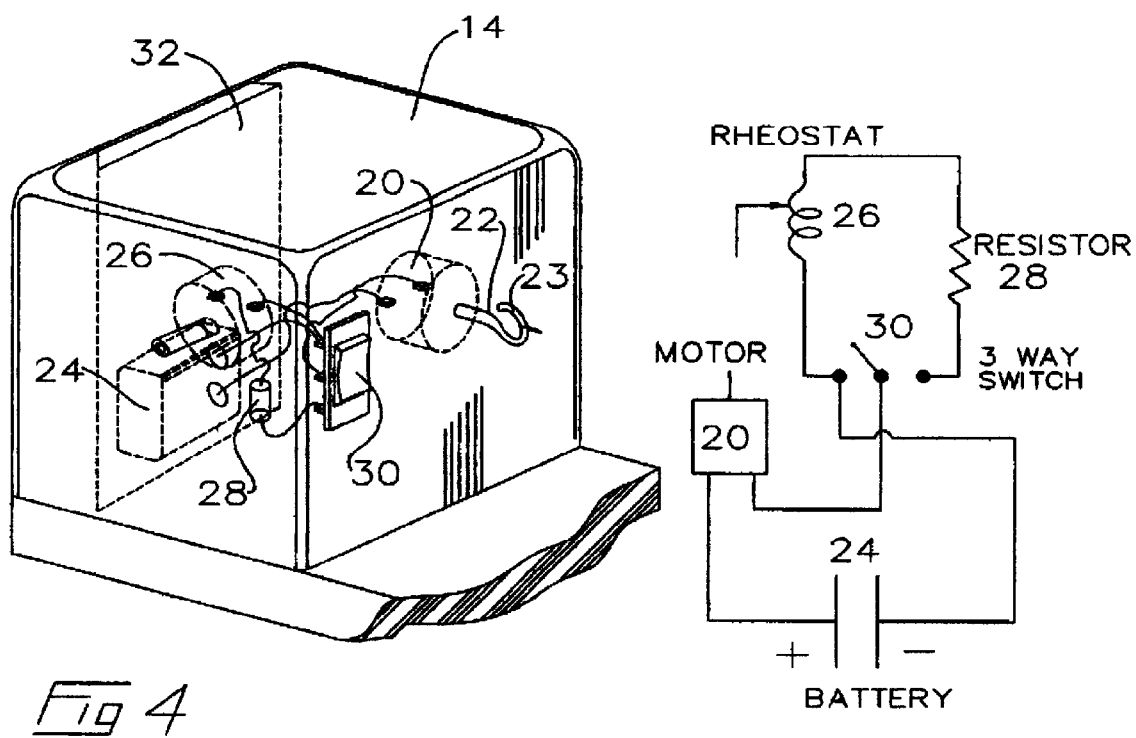

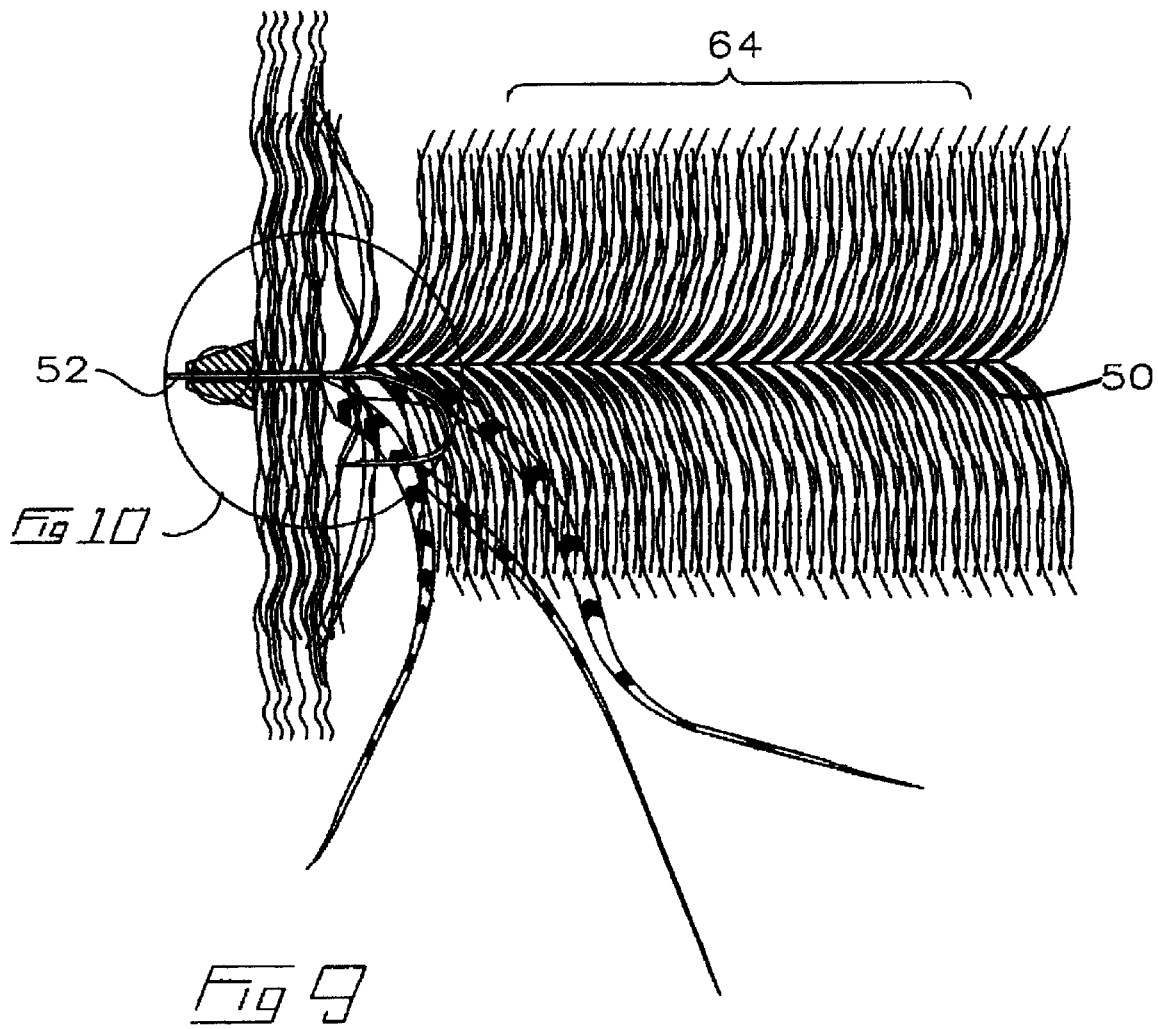

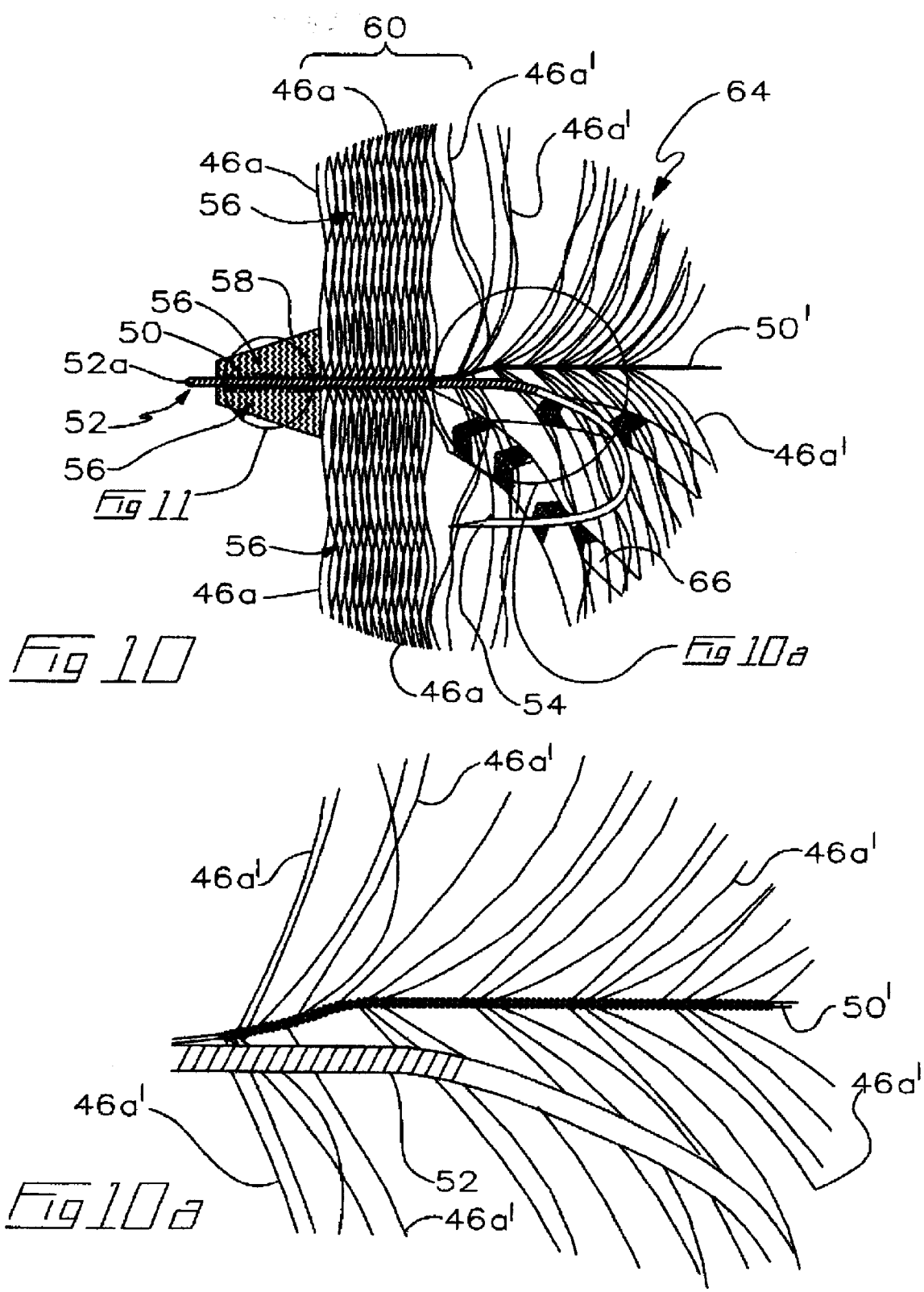

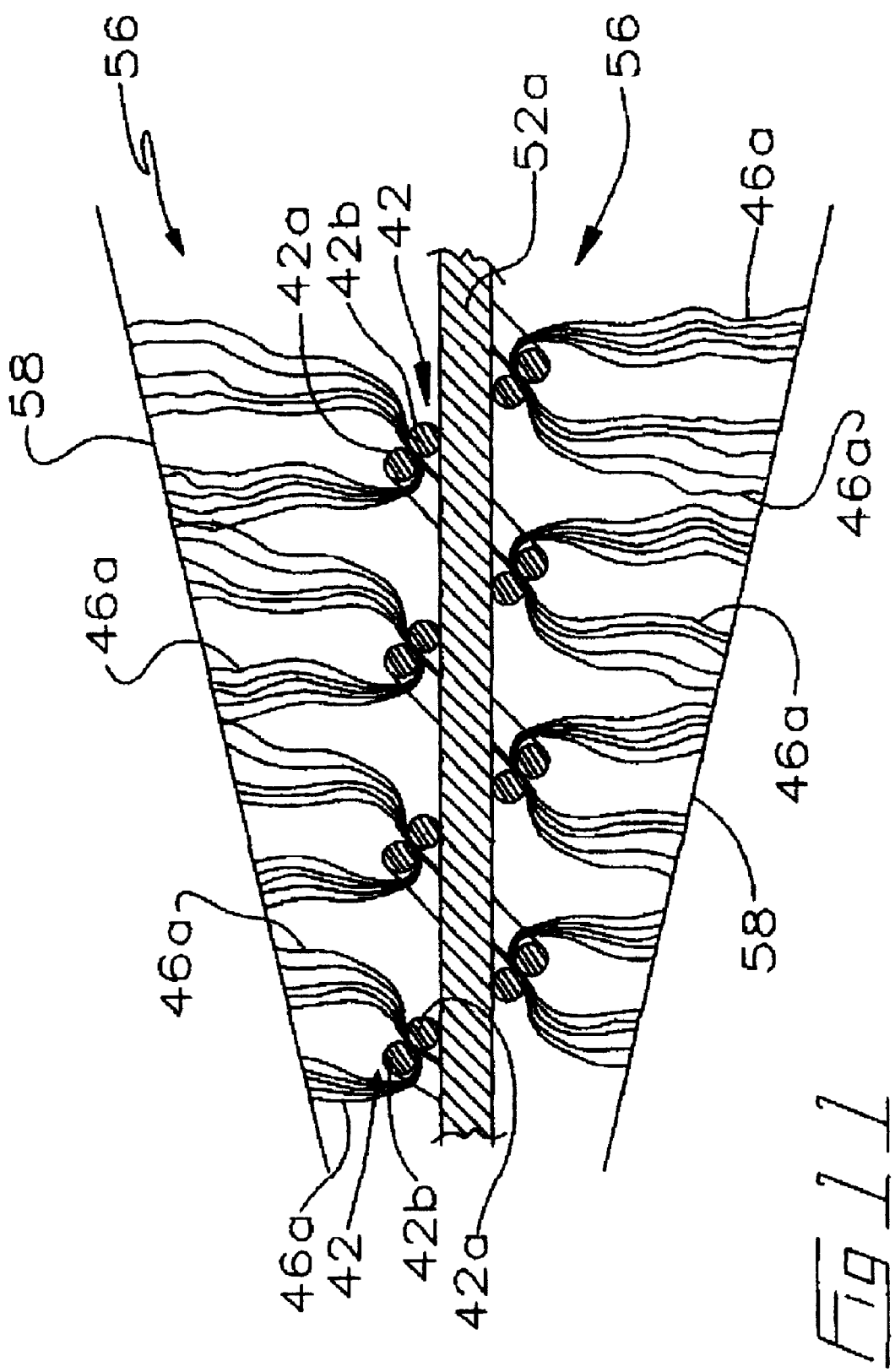

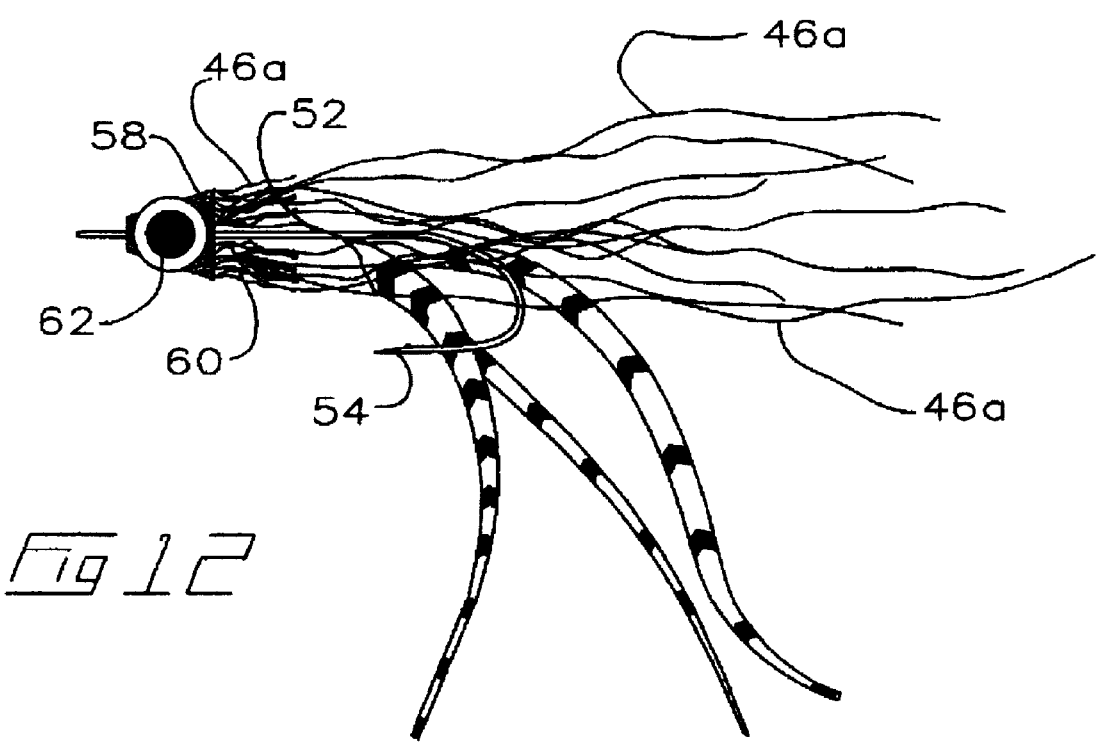

DUBBING ASSEMBLY IN FLY HOOK PRODUCTION

CROSS REFERENCE TO RELATED APPLICATION

This application claims priority from U.S. Provisional Patent Application No. 60/087,969 filed Jun. 4, 1998 titled Machine For Dubbing Assembly In Fly Hook Production.

FIELD OF THE INVENTION

This invention relates to the field of mechanisms for the assembly of the various components comprising the body which is attached to the shank of a hook during the production of artificial fly fishing hooks and lures, and in particular relates to a novel method for the pre-assembly of all body components or dubbing prior to attachment to the hook shank.

BACKGROUND OF THE INVENTION

It is known that in the field of sport fishing and specifically fly fishing that the angler goes to great length to match his lure to the specific aquatic or airborne insect currently being found attractive by the fish as a source of food. When such an insect is identified, the angler then selects for use a pre-made fly hook which closely resembles the natural insect.

It will be appreciated that the art of fly-tying is a skill which is beyond the expertise of many avid anglers and is generally so time consuming that custom fly-tying during a fishing trip is considered impracticable by most. In addition due to these constraints should an especially effective fly hook be damaged or lost while in use, the angler must either replace it or utilize a less effective substitute. Both options are unsatisfactory due to the associated cost in the case of the former, and dissatisfaction in the case of the latter.

It is known to use so-called dubbing to match the normal seasonally expected insects. Dubbing can be pre-made in quantity and quickly attached to the shank of a hook of the size required for the specific species and size of fish, without prolonged interruption, while the angler is fishing. It is one object to provide an apparatus which may be carried by an angler while fishing for the convenient manufacture of new dubbing matching current fishing conditions.

The dubbing process has been in use for over a century in Europe and is considered "state of the art" in the fly tying industry. One or more materials are mixed or blended and often a bright sparkle synthetic is added to give the blend a flashy, light reflecting quality. This mixture is known as "dubbing material." Fly tying thread is attached to a fly hook that is held in a fly tiers vice. The thread is often treated with "dubbing wax" or a bonding agent and a twisting motion wraps the dubbing material onto the thread. The "fuzzy" thread is then wrapped around the fly hook. This procedure is the standard method of "dubbing". The end resulting fly has a very "buggy" unique look compared to the usual appearance of a yarn wrapped fly. It is arguable that the world's best looking, fish catching flies are dubbed flies. This is due to their "life like" and natural appearance.

The dubbing material used is affixed to the tier's thread by means of a sticky dubbing wax or bonding agent and is loosely held in position. Although the artistic appearance is excellent, the overall strength of the fly is very limited. The dubbed fly will readily fall apart during the fish catching process, limiting the life of the fly. Often the dubbed fly must have a "ribbing" wrapped around the body in order to "hold" the dubbing material in place. This is sometimes undesirable and strength is limited due to the overall strength of the "ribbing" it's self. As well, the fly is only as strong as the thread and glue that binds it together. Many traditionally constructed dubbed flies have an extremely short useful life span. Many exact copies of the same pattern must be on hand when fishing. Traditional dubbing is a time consuming process. The necessity to duplicate numerous exact patterns creates the reality of the "disposable fly." Due to this "disposability" inexpensive fly hooks are often used to compensate for the overall cost of reproducing multiple copies. Inexpensive fly hooks are inferior in their overall strength and are often not nearly as sharp right out of the box. Inexpensive hooks often dull faster than premium hooks and are subject to breakage or deformation on large fish. "Inferior" fly-fishing hooks are a huge disadvantage to the fly fisherman. A fly fisherman heading out on a fishing trip often takes 6–12 flies of the exact same pattern in order to have ample supply.

Dubbing materials may be as follows:

| | | | |
|---|---|---|---|
| Seal | Angora | Sheep's Wool | Squirrel |
| Rabbit | Marino | Goat | Polar Bear |
| Fox | Black Bear | Possum | Raccoon |
| Seal fur substitute | | Crystal Flash ™ | Antron ™ |
| Scintilla ™ | | Lite Bright ™ | Flashabou ™ |

SUMMARY OF THE INVENTION

A machine for dubbing assembly in fly hook production includes a base having a vertical dowel mounted to one end of the base, and a housing mounted to the other end. A work platform is pivotally mounted to one side of the base so that the platform may be elevated or lowered. A drive motor is mounted within the housing. The motor drives a drive shaft. The drive shaft terminates in a hook or eye. A second eye is mounted to the vertical dowel. The second eye projects toward, in opposed facing relation with, the drive shaft. The second eye supports a tensioning spring which has a barrel swivel attached to its opposite end. One or more filaments may be attached to a ring on the barrel swivel so as to extend across the work platform and be secured to the hook or eye on the drive shaft. Dubbing material is applied to a single filament or sandwiched between double strand filaments. Double strand filaments are twisted into a helix to flare the dubbing material.

The housing contains a power source, such as a battery, for the drive motor and a means whereby the rate of rotation of the drive motor may be selectively controlled by a user, such as by a rheostat or linear potentiometer. A switch may be provided to isolate the power source from the drive motor.

Thus in summary, according to the invention as claimed herein, the apparatus of the present invention for making a single strand dubbed filament includes: a base having first and second opposite ends, a motor mounted on the first end of the base, a driveshaft coupled to the motor, the motor for rotating the driveshaft at a selectable constant rotation speed about an axis of rotation, a rigid support mounted at the second end of the base, a resilient biasing means mounted to the rigid support, a swivel coupling mounted to the resilient biasing means in opposite relation to the rigid support and in opposed facing relation to the driveshaft, the driveshaft and the swivel coupling lying on the axis of rotation, wherein, when a flexible filament is secured at a first end of the filament to the driveshaft and secured at an opposite second end of the filament to the swivel coupling so as to lie along the axis of rotation, actuation of the motor rotates the driveshaft and the filament about the axis of rotation, whereby adhering dubbing material by adhesive to the filament driving the rotation of the filament forms a single strand dubbed filament.

The resilient biasing means may be a tensioning spring.

The swivel coupling may be a frictional swivel coupling restricting rotation of the second end of the filament to a rotation rate that is less than a simultaneous rotation rate of the driveshaft and the first end of the filament.

The frictional swivel coupling, may be a barrel swivel.

Advantageously, a work platform is provided which is selectively positioniable into parallel relation to the axis of rotation. The work platform is pivotally mounted to the base so as to be pivotable between an elevated generally horizontal position, wherein an upper planar surface of the platform is adjacent the axis of rotation, and a lowered position lowered towards the base array from the axis of rotation wherein the upper planar surface remains parallel to the axis of rotation.

The selectable constant rotation speed of the motor may be selectively controlled by a linear potentiometer.

The apparatus of the present invention for making a double strand dubbed filament includes: a base having first and second opposite ends, a motor mounted on the first end of the base, a driveshaft coupled to the motor, the motor for rotating the driveshaft at a selectable constant rotation speed about an axis of rotation, a rigid support mounted at the second end of the base, a resilient biasing means mounted to the rigid support, a coupling mounted to the resilient biasing means in opposite relation to the rigid support and in opposed facing relation to the driveshaft, the driveshaft and the coupling lying on the axis or rotation, wherein, when a flexible filament is secured at a first end of the filament to the driveshaft and secured at an opposite second end of the filament to the coupling so as to lie along the axis of rotation, actuation of the motor rotates the driveshaft and the filament about the axis of rotation, and wherein the filament comprises a pair of filament strands which, when tensioned, are snugly adjacent and parallel, the pair of filament strands of a flexible permanently deformable material wherein the rotation of the filament permanently twists the pair of filament strands around one another about the axis of rotation so as to permanently twist an array of dubbing material fibres spread along so as to be generally perpendicular to, and sandwiched between, the pair of filament strands into a hairy three dimensional body of revolution about the axis of rotation, whereby a dubbing brush is produced.

As before, the resilient biasing means may be a tensioning spring.

In one embodiment the coupling is a frictional swivel coupling restricting rotation of the second end of the filament to a rotation rate that is less than a simultaneous rotation rate of the driveshaft and the first end of the filament. The frictional swivel coupling may be a barrel swivel.

A work platform is provided in one embodiment which is selectively positionable into parallel relation to the axis of rotation. The work platform is pivotally mounted to the base so as to be pivotable between an elevated generally horizontal position, wherein an upper planar surface or the platform is adjacent the axis of rotation, and a lowered position lowered towards the base array from the axis of rotation wherein the upper planar surface remains parallel to the axis of rotation.

The selectable constant rotation speed of the motor may be selectively controlled by a linear potentiometer.

The method of the present invention of making a single strand dubbed filament includes the steps of:
 (a) securing the ends of a single strand filament to the driveshaft and the swivel coupling so that the filament lies along the axis of rotation,
 (b) applying adhesive along the filament,
 (c) actuating the motor so as to rotate the filament about the axis of rotation,
 (d) adhering dubbing material to the filament as the filament is rotating about the axis of rotation.

The method may include the further step of restricting a rate of rotation of the swivel coupling about the axis of rotation relative to a rate of rotation of the driveshaft so as to restrict rotation of the end of the filament secured to the swivel coupling relative to rotation of the end of the filament secured to the driveshaft upon the actuation of the motor.

The method may also include the further step of positioning a work platform into parallel relation to the axis of rotation.

The method may also include the further step of selectively controlling the selectable constant rotation speed by means of a linear potentiometer.

The method of the present invention of making a double strand dubbing brush includes the steps of:
 (a) securing the ends of a double strand filament to the driveshaft and to the coupling so as to tension the filament therebetween and so as to maintain strands of the double strand filament snugly adjacent and parallel, wherein the strands are of a permanently deformable material when twisted,
 (b) spreading an array of dubbing material fibres generally evenly along, so as to be generally perpendicular to, and sandwiched between the strands,
 (c) actuating the motor so as to twist the filament about the axis of rotation thereby permanently twisting the strands around one another, whereby the dubbing material fibres are anchored between the strands and rotated about the axis of rotation to form a hairy three dimensional body of revolution about the axis of rotation.

The method may include the further step of restricting a rate of rotation of the coupling about the axis of rotation relative to a rate of rotation of the driveshaft by means of a frictional swivel coupling so as to restrict rotation of the end of the filament secured to the frictional swivel coupling relative to rotation of the end of the filament secured to the driveshaft upon the actuation of the motor.

The method may also include the further step of positioning a work platform into parallel relation to the axis of rotation.

The method may also include the further step of selectively controlling the selectable constant rotation speed by means of a linear potentiometer.

The method may also include the further step of elevating the work platform, wherein the work platform is pivotally mounted to the base, into a generally horizontal position adjacent the axis of rotation prior to the step of spreading the dubbing material fibres along the strands.

The present invention includes a dubbing brush made according to the above method. In particular the present invention includes within its scope a double strand dubbing brush having:
 (a) a helix core of two permanently twisted flexible elongate members (b) a substantially uniform array of generally parallel fibres spread along, so as to be sandwiched between, the two permanently twisted flexible elongate members, the array generally bisected by the helix, (c) the array flared so as to form a radially extending array about the helix uniformly dense aid uniformly distributed along the helix core.

The dubbing brush may include flexible elongate members made of wire. Further, in the dubbing brush a majority of the fibres in the array may be of uniform thickness and length, and the fibres may have been stacked and brushed or raked out during twisting formation of the helix core.

Also included within the scope of the present invention is a fly hook which includes:

(a) a dubbing hook brush made according to the method of the present invention, (b) winding the dubbing brush around a shank of the fly hook to form a body, (c) trimming the body over a first portion of the body, and (d) brushing out the body over a remaining portion of the body.

Further, the fly hook may include a tail mounted to the shank, wherein the tail is a tail mounted to the shank, wherein the tail is a second dubbing brush made according to the method the present invention, the tail mounted at one end thereof to the shank so as to trail the tail from the shank.

BRIEF DESCRIPTION OF THE DRAWINGS

FIG. 1 is a perspective view of a preferred form of the Dubbing Assembly Machine.

FIG. 2 is an enlarged perspective view of the first end of the Dubbing Assembly Machine illustrating the work platform in use, having a wire filament tensioned thereover and having dubbing material in place.

FIG. 3 is an enlarged perspective view of the first end of the Dubbing Assembly Machine illustrating the work platform folded down in non-operational mode.

FIG. 4 is an enlarged perspective view of the second end of the Dubbing Assembly Machine illustrating the components contained within the housing.

FIG. 5 is a schematic electrical diagram.

FIG. 7a is, in perspective view, the double strand filament and work platform of FIG. 7.

FIG. 9 is a sectional view along line 9—9 in FIG. 8.

FIG. 10 is an enlarged partial view taken from FIG. 9.

FIG. 10a is an enlarged partial view taken from FIG. 10.

FIG. 11 is an enlarged partial view taken from FIG. 10.

FIG. 12 is a fly in an alternative embodiment constructed according to the present invention

DETAILED DESCRIPTION OF PREFERRED EMBODIMENTS

Figure 6:
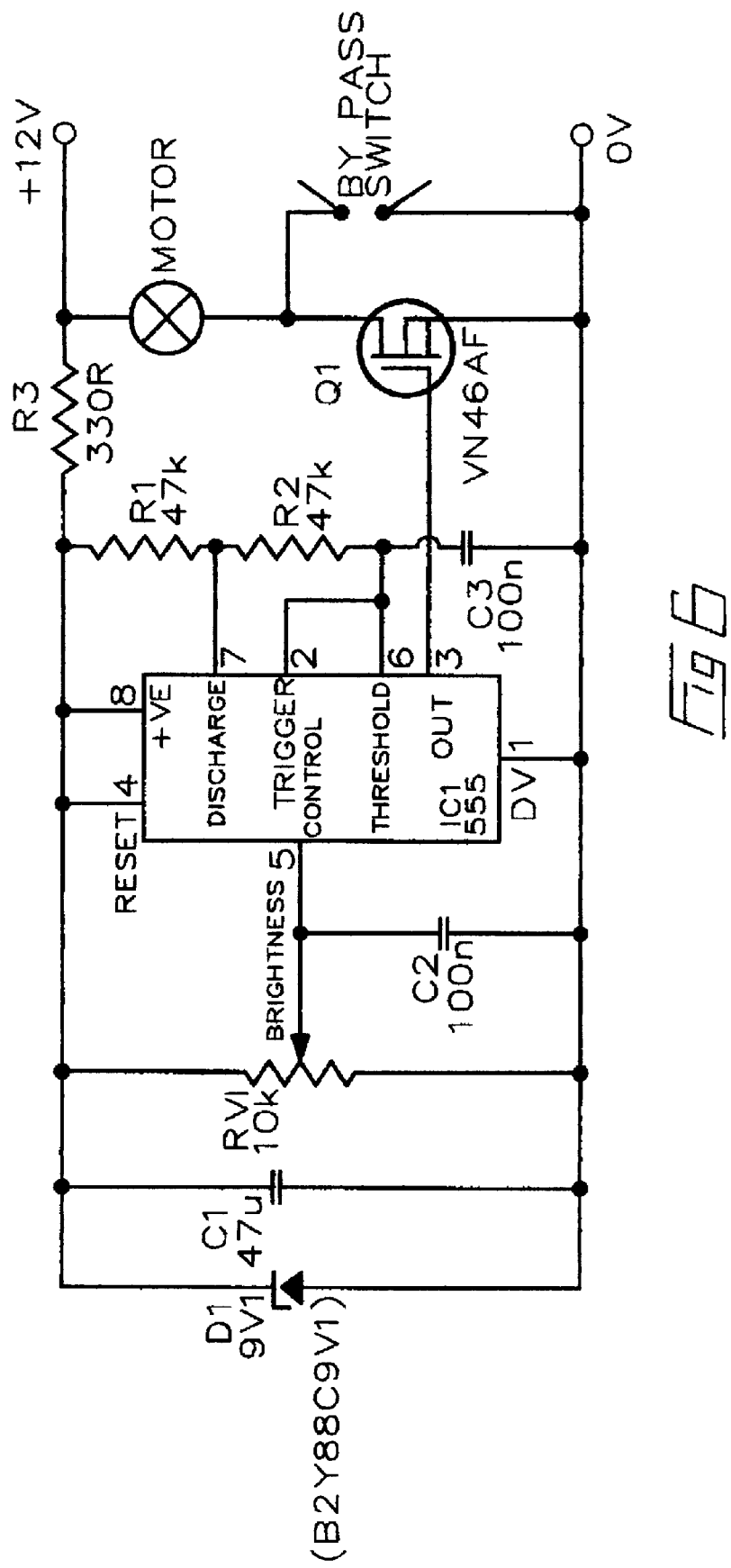
FIG. 6 is an electrical schematic according to an alternative embodiment of the present invention.

As seen in FIGS. 1–4, a rectangular planar base 10 supports a vertically oriented dowel 12 mounted to one end of the base and a housing 14 mounted to the opposite end, otherwise referred to as the motor end of the base. Off-set hinges 16 may be mounted to one side of the base. A rigid planar work platform 18 is mounted to the upper ends of hinges 16, so as to be pivotable into a position parallel to and above base 10. The base, dowel and housing may be constructed from lightweight and durable material such as hardwood or moulded acrylic or plastic materials.

Housing 14 has mounted therein an electrically powered motor 20, for example a battery powered motor, although this is not intended to be limiting. Motor 20 drives driveshaft 22. Driveshaft 22 extends from housing 14 parallel to base 10 and terminates in a hook 23, eye or the like. Driveshaft 22 is parallel to work platform 18 when platform is rotated into its horizontal operating position over base 10. In the battery powered embodiment, battery 24 is compartmentalised within housing 14. As may be seen by reference to FIG. 4 the interior of compartmentalised housing 14 is conveniently accessible by way of a removable sliding door 32 for access to the battery.

Motor speed is governed by a means for selectively adjusting the rotational speed of the motor mounted within housing 14. This may, as seen in FIG. 5, be in one embodiment be a rheostat 26 in combination with resistor 28 on a low speed selected by a three way switch 30. Three way switch 30 is mounted on one face of the housing so that in addition to isolating the motor from the power source, a high motor speed not controlled by the rheostat may be selected. A battery 24 having 6, 9 or 12 volts may be employed. An electrical schematic of a further preferred embodiment employing a pulse linear wire wound potentiometer control is illustrated in FIG. 6. Advantageously, a 250 ohm pulse linear potentiometer is employed. In this embodiment slow speed torque is improved, and manual control (by finger pressure or the like) of twisting rate of the driveshaft may not be required. Further, external 3-way switch 30 is not required. Instead a potentiometer control knob (not shown) may be provided to selectively control rotation speed regulated by the potentiometer.

A tension spring 34 is mounted adjacent the upper end of dowel 12 by means of a second hook, for example eye hook 36. The free end of the tension spring is secured to a first end of barrel swivel 38. Ring or eye 40 is mounted to a second, opposite, end of barrel swivel 38.

Filament 42, advantageously a wire filament, is tensioned between opposed facing hooks 23 and 36 by securing a first end of filament 42 to hook 23 and by securing an opposite second end of filament 42 to ring 40. When filament 42 is pulled taut, driveshaft 22, hook 23, filament 42, ring 40, barrel swivel 38, tension spring 34 and hook 36 all lie along common axis of rotation B—B.

A single strand of filament 42 may be employed between hook 23 and ring 40 by tying the opposite ends of the filament to hook 23 and ring 40 respectively. Alternatively, a double strand filament 42 may be employed by forming a loop. For example, a first end of filament 42 is secured to hook 23. The opposite second end of the strand is looped through ring 40 and brought back to hook 23, and secured thereto. The strand is thus doubled back on itself to form a double strand filament 42.

Operation of motor 20 rotates driveshaft 22 and hook 23 about axis B—B. Ring 40 on barrel swivel 38 is free to also rotate about axis B—B, unless its rotation is impeded by, for example, friction in the swivel or manual intervention. With filament 42 tensioned between hook 23 and ring 40, rotation of hook 23 about axis B—B also rotates filament 42 and ring 40 about axis B—B.

It has been found advantageous that barrel swivel exhibit sufficient friction so that the rate of rotation of ring 40 about axis B—B is less than, for example ½, the rotation rate of driveshaft 22. If rotation of ring 40 about axis B—B is impeded, for example slowed or stopped altogether, then continuing rotation of driveshaft 22 and hook 23 causes filament 42 to twist about axis B—B, gradually increasing tension applied to spring 34 as the twisting of filament 42 causes the length of filament 42 to shorten. Eventually, excessive continued twisting or filament 42 against the return biasing force of tension spring 34 causes the filament material to fail.

If filament 42 is a double strand filament, twisting of the double strand filament about axis B—B forms a double strand helix, or otherwise causes one of the strands to wrap around the other strand. Hereinafter the result of such twisting is collectively referred to as a helix. If the filament is wire or other flexible permanently deformable material, the helix will be permanently formed. There is some latitude in the core material. Ordinary fly-tying wire makes an excellent core.

The rotation or twisting of filament 42 about axis B—B may be employed to construct, where filament 42 is single strand, a direct-dubbed single wire wrapped filament, or, where filament 42 is double strand, a dubbing brush or double-strand dubbing loop.

The term "dubbing" conventionally refers both to a material 46 which is affixed to filament 42 and to a set of techniques used to apply the material to a shank of a fly hook. The dubbing material itself may be composed of natural furs, synthetic fiber or filaments, clipped feather barbs, or any combination of these, while the conventional dubbing process most often involves wrapping or twisting such materials around an elongate flexible core, that is, around filament 42. The resultant dubbed core is subsequently wrapped around the shank of the fly hook, or in the present invention also allowed to trail from the fly hook.

So-called direct dubbed single wire wrapping, is a process of wrapping any elongated dubbing materials 46 such as peacock herl, ostrich herl, hackle feathers, threads, super floss™ colored tinsels, yarns or common knitting wool around a central wire core such as filament 42. The wire core is coated, for example by means of brush 44, with an adhesive bonding agent such as Cellire™. The dubbing material to be wrapped is attached to the apparatus, starting for example near the motor end of the wire core adjacent hook 23 as seen in FIG. 2. In one embodiment, the motor is engaged to spin the wire in direction C about axis B—B as the dubbing material is applied in direction A to the adhesive coated wire core. Inherently structurally weak dubbing materials, such as peacock herl, consequently are given a new tightly bonded inner wire core, held securely by the adhesive. The wire core may then be removed from between hook 23 and ring 40, and the resulting dubbed filament wrapped or wound on to the shank of a fly hook. The fly as a consequence is referred to as a having a wire core, i. e. the wire filament 42 which is wrapped around the shank, with the dubbing material giving a "buggy" or hairy full-bodied appearance. What would otherwise be a fragile fly in terms of how securely the dubbing material is affixed to the shank, now has increased structural integrity. In applicant's observation, once secured according to the present disclosure, the peacock herl or other dubbing material can only be removed by being sanded or scrapped off the wire core. The wire core has to be severed to remove the dubbing material from the fly in normal usage. Thus the overall life span of the fly has been increased.

During the filament rotation or twisting operation, work platform 18 is pivoted downwards out of its horizontal position, illustrated in FIG. 3. One end of a single wire filament 42, the diameter of which relates directly to the size of fly hook to be used, is looped through ring 40 on barrel swivel 38, and secured thereto. Its free end is attached to hook 23. Adhesive material, Cellire is then painted over the full length of filament 42. For winding fine material, Cellire is painted on in a thin coat. For single wire dubbing, a heavier application is made, typically heavy enough to form droplets of Cellire along the length of the filament. For double wire dubbing, as described below, a heavy application of Cellire may also be made on the strands of filament 42, typically heavy enough so as to form droplets. Work platform 18 is then used in its lowered position underneath the single wire filament, as a guide for sliding the users hand therealong in direction A while applying dubbing material 46 to the filament.

As the motor slowly spins wire filament 42, dubbing material 46 is wound around it. The tension spring compensates for the change in length as the wire filament is twisted affording the operator some time to adjust his dubbing. The barrel swivel 38 allows and also controls a rate of twist of wire filament 42 to a rate that is less than (for example, approximately less than or equal to) one half the motor revolutions per minute (rpm) and corresponding rotation rate of driveshaft 22. Finishing of the strand of dubbing may be accomplished by freeing the end attached to the ring 40 on the barrel swivel 38, holding this free end in one hand and operating the motor switch 30 with the other to apply several short bursts of high rotation to the strand. Dubbing in this fashion utilising a single fine wire filament produces a relatively fine loosely textured body when fixed to the shaft of a fly hook. This is ideal for smaller sized fishing flies.

The so-called "wire core dubbing brush" is used to produce stronger more durable, artistic fishing flies. The finished "wire core dubbing brush" is wrapped lightly on the shank of a fly hook and secured with quality thread or wire. The fly is then trimmed to the desired shape and size. The resulting flies can exhibit unique artistic appearances due to the spinning and brushing out process used to make the wire core dubbing brush. "Buggy" and realistic looking flies may be produced, for example flies exhibiting hackles, legs, tails, sculptured bodies and manes or collars. Also the strength of the finished fly is enhanced.

The method for forming dubbing brushes is a version of the "dubbing loop" or "spinning loop," in which dubbing is positioned inside a loop of tying thread. Conventionally, the thread is subsequently spun, trapping (and sometimes flaring) the fibres in a tightly twisted core. Dubbing brushes, however, differ in a couple of small, but significant, respects.

First, the loop is formed of wire and, once spun, will not unravel when tension is relaxed. Second, where spinning loops are usually formed as needed during tying, dubbing brushes can be made in advance and stored for later use because they remain permanently twisted. Since the brush isn't formed during tying, it is possible to use the specialized equipment of the present invention at a remote or home site so as to make dubbing-brush fabrication faster, easier, and more versatile. The apparatus of the present invention allows production of unique dubbing brushes long enough in length to dress two or more flies, giving the procedure a kind of economy that is not possible with spinning loops. Although the weight produced by a wire core primarily (but not exclusively) restricts dubbing brushes to subsurface patterns, they are nonetheless versatile.

Brushes can be spun from strips of hair in which the underfur and guard hairs are mounted perpendicular to the wire core to produce a spiky, cylindrical, uniform fur chenille. Chopped natural or synthetic dubbing (long- or short-fibered) produces dubbing brushes that resemble a conventional direct-dubbed thread. Even feather barbs, usually marabou or Cul-de-Canard (CDC), and synthetic yarns are suitable dubbing-brush material.

Double wire dubbing, is accomplished, for example, using a loop of 0.009 inch stainless steel wire, to produce a dubbing brush. The dubbing brush is so strong, that once wrapped on to the shank of a fly hook and properly secured, normal fishing use will not inflict damage to the wire core dubbing brush.

In double wire dubbing, as before, a single strand of filament 42 is mounted between ring 40 and the eye or hook on shaft 22. Cellire is painted onto the first filament. Work platform 18 is then elevated to horizontal. Material 46 is laid out evenly on top of the single strand. A second strand of filament 42 has been tied to ring 40 and allowed to hang down with its free end loose. The second strand is grasped and heavily Cellired. Its free end is then threaded through the eye or hook 23 on shaft 22 so as to extend the second strand parallel and adjacent to the first strand. With the free end so threaded, the motor is engaged to wind or twist the strands together. Once the winding of both strands has commenced, the work platform is lowered. With dubbing material 46 sandwiched between the two strands of filament 42 when filament 42 (collectively here referring to both strands) is slowly spun by the motor, the dubbing and strands are twisted together. This procedure permits the creation of fuller, more uniformly hairy or bushy, more robust body material which can be used in the production of larger flies, for example, for catching large trophy fish.

Figure 7:
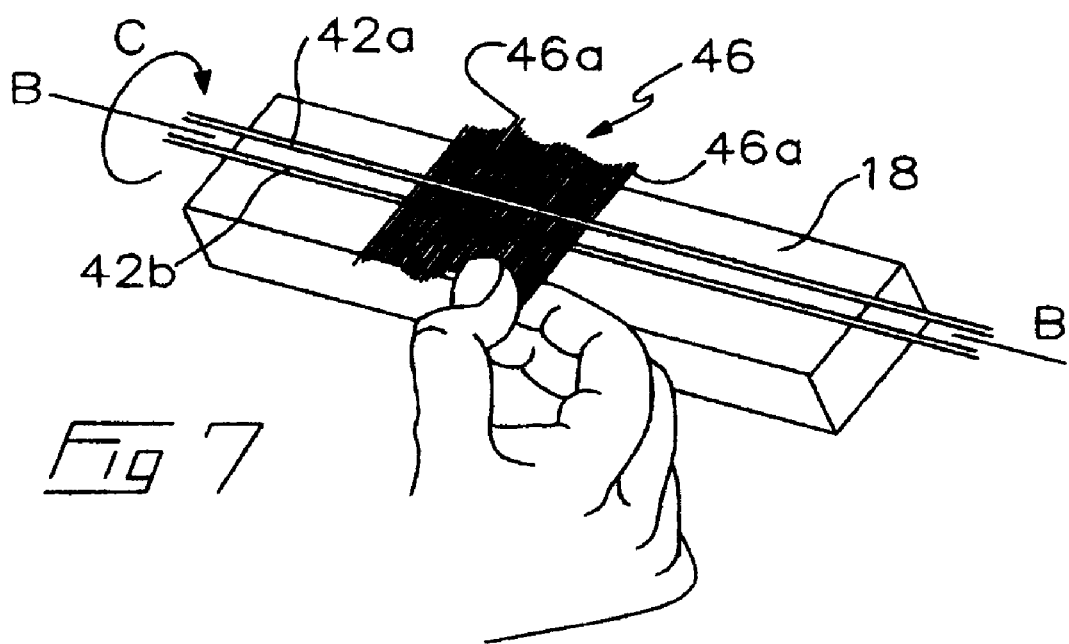
FIG. 7 is, in perspective partially cut-away view, a user spreading dubbing material fibres between a double strand filament on a work platform.

Thus, as described above, in production of double strand dubbing brushes, filament 42 may be thought of as formed of a wire loop having parallel adjacent strands 42*a* and 42*b*. The wire loop is twisted into a permanently formed double strand helix, or otherwise a wrap of one strand around the other, by twisting of the wire loop between the hook 23 and ring 40. Dubbing material 46 has been sandwiched between the adjacent taut strands 42*a* and 42*b* as better seen in FIGS. 7 and 7*a* prior to twisting and uniformly spread out along the loop so that the fibres 46*a* of dubbing material 46 are generally in parallel uniformly distributed array bisected by the wire strands 42*a* and 42*b* of the loop. The strands are then twisted, for example in direction C, about axis B—B to form an untrimmed brush. That is, as fibres 46*a* of the parallel uniformly spread out array of dubbing material 46 are twisted as the wire loop is formed into a tightly wound double strand helix, hereinafter helix core 50 better seen in FIG. 8, the individual fibres 46*a* rotate and flare outwardly about the longitudinal axis of the taut loop (i.e. rotate and flare about axis B—B) to form an un-trimmed three dimensional brush body of revolution about helix core 50. Helix core 50 resulting of the twisted loop forms the wire core of the dubbing brush, securely holding the trapped dubbing material fibres 46*a* along the axis of symmetry or the initially formed three dimensional body, keeping in mind that helix core 50 is flexible even though permanently formed in the helix so that once removed form between hook 23 and ring 40, the axis of symmetry may become a curved line unless pulled straight. The finished "wire core dubbing brush" has an internal wire core (i.e. helix core 50 that may not be visible depending on how much of fibres 46*a* are removed by blushing during formation of helix core 50, and by how much trimming is done to the remaining fibres 46*a*. Depending on the dubbing materials, the amount of brushing or raking applied to remove excess fibres 46*a* during formation of helix core 50, and the amount of trimming, the external appearance or finished wire core dubbing brushes can differ greatly.

As can be appreciated any number of lengths of dubbing, each up to the length or the work platform and resembling the common insects of the season, can be simply and expediently manufactured and easily carried with the angler while fishing. A new fly lure can be assembled quickly and simply during the fishing operation by selecting a hook, coating the hook shank with Cellire, cutting off a small length of wire filament reinforced dubbing and tying onto the hook with thread. Lastly, dubbing is wrapped around the shank of the hook and tied off with thread. A full fishing fly can be pre-made on a single wire.

Small quantities of the raw material known in the art for artificial fly production may be carried along with the angler and utilising this invention may quickly produce dubbing matching the unique hatch at the fishing location.

Figure 8:
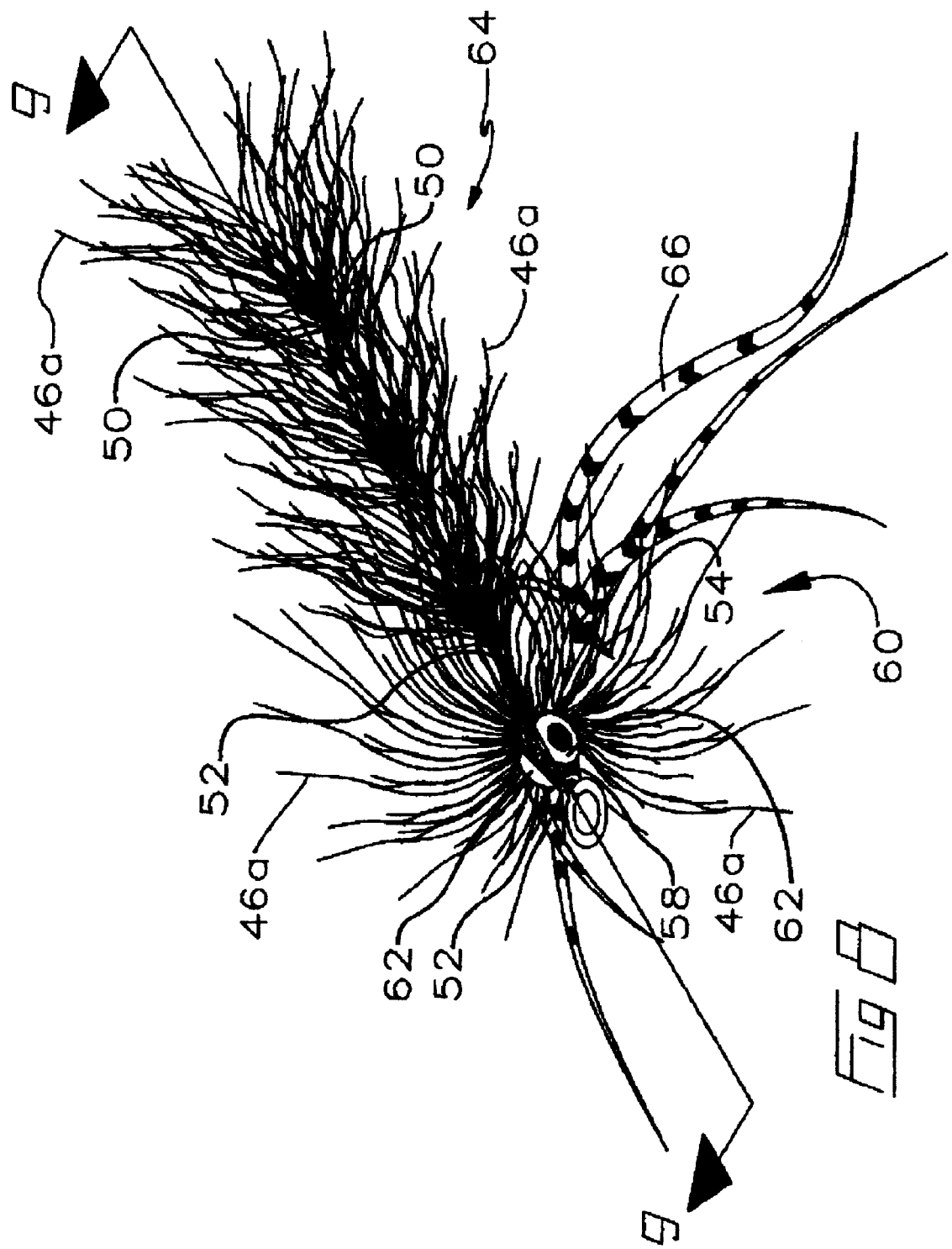
FIG. 8 is, in perspective view, a fly according to the present invention.

Using the filament twisting machine of the present invention, unique dubbing brushes and, consequently, unique flies may be manufactured which can not be obtained using conventional dubbing processes. The filament twisting machine of the present invention allows for a consistent torque to be applied to the filament so as to twist it at a uniform rate which may be controlled by the user. A user's hands are left free, for example in double strand dubbing, to both control the rotational speed and torque being constantly applied to the driveshaft and wire filament, and to brush or rake the dubbing material fibres as the double strand filament is slowly twisted into its permanently formed helix. Motorized constant torque twisting of the filament gives the user time and the free hands to vigorously brush (using a brush) or rake (using a rake) out fibres 46*a* as they slowly twirl and flare about axis B—B. The result is a conformly hairy or bushy full bodied three dimensional body of revolution symmetric about axis B—B having generally constant "hairiness", thickness, density and shape along the length of filament 42, assuming it is desired to fully brush out the dubbing material fibres along the entire length of the filament as the double strands are being twisted. The uniformity and "hairiness" (such as illustrated in FIGS. 8 and 9) is not obtainable using conventional methods. The resulting dubbing brush may be initially trimmed, and whether or not initially trimmed, either wound onto shank 52 of the fly hook or mounted to shank 52 only at one end of the dubbing brush so as to form a tail 64 trailing behind the fly hook as better seen in FIGS. 9, 10 and 10*a*.

As better seen in FIG. 10 and 52*a* of shank 52, being the end opposite barbed end 54, has helix core 50 tightly wound around it. Prior to being so wound, helix core 50 has been produced as a dubbing brush so that, prior to secondary trimming, as the dubbing brush is wound onto end 52*a* of shank 52, fibres 46*a* of dubbing material 46 form a thick hairy or bushy three dimensional body about shank end 52*a*. As the dubbing brush is wrapped around the solid shank, the fibres of the dubbing brush, namely fibres 46*a*, are forced away from shank end 52*a* thus producing a very dense fibre volume 56 as better seen in FIG. 11. Volume 56 may be secondarily trimmed to leave only a very dense, somewhat bristly, sculptured body having a sculptured body surface 58, for example, symmetric about shank 52*a*.

As seen in FIG. 10, secondary trimming of volume 56 may not necessarily extend along the entire length of shank end 52*a* so that, for example, only part of the shank will have a sculptured surface 58, and the remaining wrapped portion of the shank will have a very wild or buggy appearance especially, as seen in FIG. 8, where fibres 46a have been teased outwardly to form a mantle or mane 60 extending generally radially outwardly of shank 52 behind sculptured surface 58.

As better understood by reviewing FIG. 8, plastic eyes and 12 or the like may be glued by suitable adhesive to sculptured surface 58 to give a truly life-like appearance. Advantageously, enough adhesive is forced into volume 56 so as to bind eyes 62 to shank 52.

Tail 64 is made using another length of dubbing brush. This may or may not necessarily similar to the appearance of the dubbing brush wound onto shank 52. For example, the dubbing brush used for tail 64 may have been manufactured using the filament twisting machine described above to incorporate differently coloured or synthetic reflective fibres or it may be made of similar dubbing material 46 as that employed to create the dubbing brush wound onto shank 52. The choice of the dubbing material to be employed in the dubbing brush to be used for tail 64 is a matter of choice of the user in order to simulate various specific insects or the like. The fact that the dubbing brush used to create tail 64 may be an entirely different dubbing brush to that wrapped around shank 52 is indicated in the drawings by reference numerals 46a' to indicate the dubbing material fibres, and 50' to indicate the wire core of the dubbing brush forming tail 64. One end of helix core 50' is mounted to shaft 54 and the opposite end is allowed to trail behind the fly hook. Because helix core 50' is flexible, as the fly is pulled through the water, any uneven tension applied to the fishing line will cause fibres 46a' to undulate or pulse relative to helix core 50' giving the fly the appearance of swimming. Tail 64 is also free to sinusoidally or otherwise undulate behind the fly hook as the fly hook is pulled through the water.

Further decorative enhancements such as hackles or feathers 66 may also be mounted to shank 52 to further enhance a realistic buggy appearance of the fly.

It has been found that by employing the filament twisting machine above described, llama wool fibres may be readily used as dubbing material 46, successfully for the first as disclosed herein, time to materially enhance dubbing brushes used to create artistic flies. Previously, llama hair was introduced for use as a dubbing material but it did not work well in prior art dubbing methods which did not apply constant and consistent torque in a hands-free manner to the filament being twisted. Llama hair is a very light fibrous material which may be dyed into many attractive colours. Llama hairs separate nicely into uniformly spaced parallel array such as that illustrated in FIG. 7 and thus are well adapted for double wire dubbing. Once wound by the filament twisting machine of the present invention, they display not only strength but also may be readily brushed out to form a dubbing brush the fibres of which, when employed in a fly, may be teased out to create a remarkable mane or collar 60 and in one embodiment tail 64 of the sort illustrated by way of example in FIGS. 9, 10, and 10a. An artistic mane 60 and tail 64 requires in one embodiment of the present invention, that long llama hairs or other fibres be employed, which may be then later trimmed if so desired to form sculpted surface 58.

Llama hairs, for example those made commercially available by the Canadian Llama Company, have, solely because of the use of the filament twisting machine of the present invention, proven to make excellent dubbing material. The llama hair, as stated above, especially in length between 1/32 of an inch and 1 inch, are uniformly straight, although very flexible and light, and do not ball or lump. Consequently, when employed in the manufacture of a dubbing brush, a uniformly very full yet low density brush results, one which has a minimum of matted fibres wrapped around helix core 50 as opposed to extending flared radially outwardly of the core so as to provide the bushy appearance. In prior art manual methods, the result generally was a thickly wrapped mat of fibres around the double strand core rather than the fibres being brushed or raked so as to stand or flare radially outwardly of the wire core so as to produce a uniformly thick bushy brush.

Llama hairs in the length as aforesaid, may be easily blended in a blender such as a coffee grinder-style blender, so as to change primary colour rovings to any desired colour and so as to include, for example, synthetic reflective strands. Thus the resultant dubbing brush, when wrapped around a shank of a fly hook, results in multi-coloured marbling of the sculptured body or the fly following secondary trimming.

The filament twisting machine of the present invention allows for improved handling of other typically difficult to use dubbing materials such as deer hair. Deer hair is usually very difficult to tie and stack onto the shaft of a fly hook. By "stacked" what is meant that the more a dubbing material is "stacked", the thicker and fuller the resulting dubbing brush and body of the fly will be. In the prior art, typically deer hair dubbing material was held onto the shaft by thread only. Now using the filament twisting machine of the present invention, deer hair may be anchored into a dubbing brush so as to provide a very strong attachment of the deer hair to the fly once the dubbing brush is wound onto the shank of the fly hook. In the prior art, if the thread broke, the fly body came apart and the deer hair fell off. It typically was not attempted to attach deer hair as a dubbing material when manually making a dubbing brush because of the difficulty of handling the deer hair.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for making a single strand dubbed filament, comprising:

a base having first and second opposite ends, a motor mounted on said first end of said base, a driveshaft coupled to said motor, said motor for rotating said driveshaft at a selectable constant rotation speed about an axis of rotation, a rigid support mounted at said second end of said base, a resilient biasing means mounted to said rigid support, a swivel coupling mounted to said resilient biasing means in opposite relation to said rigid support and in opposed facing relation to said driveshaft, said driveshaft and said swivel coupling lying on said axis of rotation, wherein, when a flexible filament is secured at a first end of said filament to said driveshaft and secured at an opposite second end of said filament to said swivel coupling so as to lie along said axis of rotation, actuation of said motor rotates said driveshaft and said filament about said axis of rotation, whereby adhering dubbing material by adhesive to said filament driving said rotation of said filament forms a single strand dubbed filament.

2. The apparatus of claim 1 wherein said resilient biasing means is a tensioning spring.

3. The apparatus of claim 1 wherein said swivel coupling is a frictional swivel coupling restricting rotation of said second end of said filament to a rotation rate that is less than a simultaneous rotation rate of said driveshaft and said first end of said filament.

4. The apparatus of claim 1 wherein said frictional swivel coupling is a barrel swivel.

5. The apparatus of claim 1 further comprising a work platform selectively positionable into parallel relation to said axis or rotation.

6. The apparatus of claim 1 wherein said work platform is pivotally mounted to said base so as to be pivotable between an elevated generally horizontal position, wherein an upper planar surface of said platform is adjacent said axis of rotation, and a lowered position lowered towards said base away from said axis of rotation wherein said upper planar surface remains parallel to said axis of rotation.

7. The apparatus of claim 1 wherein said selectable constant rotation speed of said motor is selectively controlled by a linear potentiometer.

8. An apparatus for making a double stand dubbed filament, comprising:
   a base having first and second opposite ends,
   a motor mounted on said first end of said base, a driveshaft coupled to said motor, said motor for rotating said driveshaft at a selectable constant rotation speed about all axis of rotation,
   a rigid support mounted at said second end of said base, a resilient biasing means mounted to said rigid support, a coupling mounted to said resilient biasing means in opposite relation to said rigid support and in opposed facing relation to said driveshaft,
   said driveshaft and said coupling lying on said axis of rotation,
   wherein, when a flexible filament is secured at a first end of said filament to said driveshaft and secured at an opposite second end of said filament to said coupling so as to lie along said axis of rotation,
   actuation of said motor rotates said driveshaft and said filament about axis of rotation,
   and wherein said filament comprises a pair of filament strands which, when tensioned, are snugly adjacent and parallel,
   said pair of filament strands of a flexible permanently deformable material wherein said rotation of said filament permanently twists said pair of filament strands around one another about said axis of rotation so as to permanently twist an array of dubbing material fibres spread along so as to be generally perpendicular to, and sandwiched between, said pair of filament strands into a hairy three dimensional body of revolution about said axis of rotation,
   whereby a dubbing brush is produced.

9. The apparatus of claim 8 wherein said resilient biasing means is a tensioning spring.

10. The apparatus of claim 8 wherein said coupling is a frictional swivel coupling restricting rotation of said second end of said filament to a rotation rate that is less than a simultaneous rotation rate of said driveshaft and said first end of said filament.

11. The apparatus of claim 10 wherein said frictional swivel coupling is a barrel swivel.

12. The apparatus of claim 8 further comprising a work platform selectively positionable into parallel relation to said axis of rotation.

13. The apparatus of claim 12 wherein said work platform is pivotally mounted to said base so as to be pivotable between an elevated generally horizontal position, wherein an upper planar surface of said platform is adjacent said axis of rotation, and a lowered position lowered towards said base away from said axis of rotation wherein said upper planar surface remains parallel to said axis of rotation.

14. The apparatus of claim 8 wherein said selectable constant rotation speed of said motor is selectively controlled by a linear potentiometer.

15. A method of making a dubbed filament, comprising the steps of:
   (a) providing a base having first and second opposite ends;
   (b) providing a motor mounted on said first end of said base and a drive shaft coupled to said motor, said motor being intended for rotating said drive shaft at a selectable constant rotation speed about an axis of rotation;
   (c) providing a rigid support mounted at said second end of said base, a resilient biasing means mounted to said rigid support, and a swivel coupling mounted to said resilient biasing means in opposite relation to said rigid support and in opposed facing relation to said drive shaft;
   (d) providing said drive shaft and said swivel coupling on said axis of rotation;
   (e) securing respective ends of a single strand filament to said drive shaft and said swivel coupling so that said filament lies along said axis of rotation;
   (f) applying adhesive along said filament;
   (g) actuating said motor so as to rotate said filament about said axis of rotation; and
   (h) adhering dubbing material to said filament as said filament is rotating about said axis of rotation.

16. The method of claim 15 further comprising the step of restricting a rate of rotation of said swivel coupling about said axis of rotation relative to a rate of rotation of said driveshaft so as to restrict rotation of said end of said filament secured to said swivel coupling relative to rotation of said end of said filament secured to said driveshaft upon said actuation of said motor.

17. The method of claim 15 further comprising the step of positioning a work platform into parallel relation to said axis of rotation.

18. The method of claim 15 further comprising the step of selectively controlling said selectable constant rotation speed by means of a linear potentiometer.

19. A method of making a dubbing brush, comprising the steps of:
   (a) providing a base having first and second opposite ends;
   (b) providing a motor mounted on said first end of said base and a driveshaft coupled to said motor, said motor being intended for rotating said driveshaft at a selectable constant rotation speed about an axis of rotation;
   (c) providing a rigid support mounted at said second end of said base, a resilient biasing means mounted to said rigid support, and a coupling mounted to said resilient biasing means in opposite relation to said rigid support and in opposed facing relation to said driveshaft;
   (d) providing said driveshaft and said coupling on said axis of rotation;
   (e) securing respective ends of a double strand filament to said driveshaft and said coupling so as to tension said filament therebetween and so as to maintain strands of said double strand filament snugly adjacent and parallel, wherein said strands are of a permanently deformable material which remains flexible when twisted;

(f) spreading an array of hair-like dubbing material fibres generally evenly along, so as to be generally perpendicular to, and sandwiched between said strands;

(g) actuating said motor so as to twist said filament about said axis of rotation, thereby permanently twisting said strands around one another, whereby said dubbing material fibres are anchored between said strands and rotated about said axis of rotation to form a hairy three dimensional body of revolution about said axis of rotation;

(h) brushing-out said fibres as they twirl and flare as said filament is twisted; and (i) removing said filament from said driveshaft and said coupling so as to allow said hairy three dimensional body of revolution to flex and bend along its length for use in fly tying.

20. The method of claim 19 further comprising the step of restricting a rate of rotation of said coupling about said axis of rotation relative to a rate of rotation of said driveshaft by means of a frictional swivel coupling so as to restrict rotation of said end of said filament secured to said frictional swivel coupling relative to rotation of said end of said filament secured to said driveshaft upon said actuation of said motor.

21. The method of claim 19 further comprising the step of positioning a work platform into parallel relation to said axis of rotation.

22. The method of claim 19 further comprising the step of selectively controlling said selectable constant rotation speed by means of a linear potentiometer.

23. The method of claim 21 further comprising the step of elevating said work platform, wherein said work platform is pivotally mounted to said base, into a generally horizontal position adjacent said axis or rotation prior to said step of spreading said dubbing material fibres along said strands.

24. A method of making a dubbing brush, comprising the steps of:

(a) providing a base having first and second opposite ends;

(b) providing a motor mounted on said first end of said base and a driveshaft coupled to said motor, said motor being intended for rotating said driveshaft at a selectable constant rotation speed about an axis of rotation;

(c) providing a rigid support mounted at said second end of said base, a resilient biasing means mounted to said rigid support, and a coupling mounted to said resilient biasing means in opposite relation to said rigid support and in opposed facing relation to said driveshaft;

(d) providing said driveshaft and said coupling on said axis of rotation;

(e) securing respective ends of a double strand filament to said driveshaft and said coupling so as to tension said filament therebetween and so as to maintain strands of said double strand filament snugly adjacent and parallel, wherein said strands are of a permanently deformable material which remains flexible when twisted;

(f) spreading an array of hair-like dubbing material fibres generally evenly along, so as to be generally perpendicular to, and sandwiched between said strands;

(g) actuating said motor so as to twist said filament about said axis of rotation, thereby permanently twisting said strands around one another, whereby said dubbing material fibres are anchored between said strands and rotated about said axis of rotation to form a hairy three dimensional body of revolution about said axis of rotation;

(h) raking said fibres as they twirl and flare as said filament is twisted; and (i) removing said filament from said driveshaft and said coupling so as to allow said hairy three dimensional body of revolution to flex and bend along its length for use in fly tying.

* * * * *